(12) United States Patent
Schneider et al.

(10) Patent No.: US 11,198,141 B2
(45) Date of Patent: Dec. 14, 2021

(54) HIGH PRESSURE FLUID SPRAY NOZZLE INCORPORATING A FLOW CONTROLLED SWITCHING VALVE

(71) Applicant: STONEAGE, INC., Durango, CO (US)

(72) Inventors: Joseph A. Schneider, Durango, CO (US); Timothy M. D. Tormey, Hesperus, CO (US)

(73) Assignee: STONEAGE, INC., Durango, CO (US)

( * ) Notice: Subject to any disclaimer, the term of this patent is extended or adjusted under 35 U.S.C. 154(b) by 81 days.

(21) Appl. No.: 16/590,175

(22) Filed: Oct. 1, 2019

(65) Prior Publication Data

US 2020/0114371 A1 Apr. 16, 2020

Related U.S. Application Data

(60) Provisional application No. 62/745,119, filed on Oct. 12, 2018.

(51) Int. Cl.
| | | |
|---|---|---|
| *B05B 1/16* | (2006.01) | |
| *F16L 55/38* | (2006.01) | |
| *F16L 101/50* | (2006.01) | |
| *F16L 101/12* | (2006.01) | |

(52) U.S. Cl.
CPC .......... *B05B 1/1672* (2013.01); *F16L 55/38* (2013.01); *F16L 2101/12* (2013.01); *F16L 2101/50* (2013.01)

(58) Field of Classification Search
CPC ........ B05B 1/1672; F16L 55/38; E03F 9/005; B65D 47/24; B23P 15/002; B60T 8/367; B21K 1/22; F04B 53/129; F04B 39/1013; F02M 26/66; F02M 21/0269; F02M 63/0035; Y10T 29/49298; A62C 31/22; F16K 11/18

USPC .............. 239/556, 390, 396, 271, 559, 560; 137/119.03, 119.04, 119.05, 119.08; 169/70
See application file for complete search history.

(56) References Cited

U.S. PATENT DOCUMENTS

| | | |
|---|---|---|
| 5,551,458 A | 9/1996 | Faxon |
| 6,059,202 A | 5/2000 | Zink et al. |
| 8,667,987 B2 | 3/2014 | Zink |
| | (Continued) | |

OTHER PUBLICATIONS

International Search Report and Written Opinion, dated Jan. 23, 2020, from corresponding International Patent App. No. PCT/US2019/054112.

*Primary Examiner* — Chee-Chong Lee
*Assistant Examiner* — Kevin Edward Schwartz
(74) *Attorney, Agent, or Firm* — Greenberg Traurig, LLP

(57) ABSTRACT

A nozzle assembly comprises a hollow nozzle body having a central bore and a plurality of ports extending through the body from the central bore; and a switching valve assembly disposed in the central bore that directs fluid flow to ports upon application of fluid flow above a predetermined threshold to the inlet and directs fluid flow to different ports upon fluid flow having subsequently dropped below the predetermined threshold and then exceeding the predetermined threshold. The assembly comprises a cylindrical poppet slidably disposed within the central bore, a guide between the nozzle body and the poppet, and a biasing member within the cartridge case between the front portion of the nozzle body and the poppet urging the poppet away from the front portion of the cartridge case.

16 Claims, 7 Drawing Sheets

(56) References Cited

U.S. PATENT DOCUMENTS

| | | | |
|---|---|---|---|
| 9,395,001 B2 * | 7/2016 | Andersen | B05B 13/0627 |
| 9,702,136 B2 * | 7/2017 | Andersen | F16K 11/04 |
| 9,845,594 B2 * | 12/2017 | Andersen | B08B 9/0495 |
| 10,730,060 B2 * | 8/2020 | Lu | B05B 1/1672 |
| 2004/0261822 A1 | 12/2004 | Ura | |
| 2014/0250576 A1 * | 9/2014 | Pasquini | E03D 9/005 4/223 |
| 2016/0199856 A1 | 7/2016 | Raghunandan et al. | |
| 2016/0244959 A1 | 8/2016 | Andersen | |

* cited by examiner

HIGH PRESSURE FLUID SPRAY NOZZLE INCORPORATING A FLOW CONTROLLED SWITCHING VALVE

CROSS REFERENCE TO RELATED APPLICATIONS

This application claims the benefit of priority of U.S. Provisional Patent Application Ser. No. 62/745,119 filed Oct. 12, 2018, entitled "HIGH PRESSURE FLUID SPRAY NOZZLE INCORPORATING A FLOW CONTROLLED SWITCHING VALVE", the content of which is incorporated by reference herein in its entirety.

BACKGROUND OF THE DISCLOSURE

Traction nozzles are used in sewer pipe lines and other piping systems to assist in pulling high pressure hose into the pipe to reach obstructions requiring removal. These traction nozzles have jet tips oriented at an angle rearward in order to generate thrust in the nozzle within the pipe to assist in pulling the hose through and along long stretches of pipe and around pipe bends. These nozzles have forward directed jet tips and may also have laterally directed tips to ablate the obstructions encountered. However, the forward directed jet tips produce a force counter to the forward travel of the nozzle through the pipe. This counterforce hinders effective deployment of the high pressure hose and reduces the net pulling force produced by the traction nozzle on the high pressure hose. Thus there is a need for a switching mechanism that does not generate a counterforce during traction operation, yet facilitates operation of an effective fluid jet nozzle during actual cleaning operations. Furthermore, there is a need for a nozzle assembly incorporating a switching valve assembly that is replaceable and has a minimum number of component parts in order to simplify design and maintenance of such a nozzle assembly.

SUMMARY OF THE DISCLOSURE

An exemplary embodiment of a nozzle assembly in accordance with the present disclosure includes a hollow nozzle head body having a central bore containing a switching valve assembly captured in the body by an inlet nut fastened to the nozzle head body. The valve assembly includes a movable poppet disposed in the central bore, a guide member in the bore, and a bias member in the bore between the nozzle head body and the poppet resiliently biasing the poppet toward the inlet nut at a rear end of the central bore.

This nozzle assembly more particularly includes a hollow nozzle body having a front portion and a rear portion, a central bore through the rear portion, and a plurality of ports extending out of the nozzle body through the front portion of the body from the central bore. A switching valve assembly is disposed in the central bore. This assembly is operable to direct fluid flow from an inlet to the rear portion to at least one of the plurality of ports upon application of fluid flow above a predetermined threshold to the inlet and directs fluid flow from the inlet to at least a different one of the plurality of ports upon fluid flow having subsequently dropped below the predetermined threshold and then exceeding the predetermined threshold.

One embodiment of the switching valve assembly includes a cylindrical poppet slidably disposed within the central bore, a guide member in the central bore engaging the poppet, and a biasing member in the central bore between the front portion of the nozzle body and the poppet. This biasing member is preferably a coil spring. The spring urges the poppet away from the front portion of the nozzle body.

The assembly preferably includes a plurality of guide members engaging the poppet to alternatingly align the poppet with the at least one of the plurality of ports and the different at least one of the plurality of ports each time the poppet abuts one of the front portion of the nozzle body or a flow diverter positioned in the central bore. The guide members are preferably pins through a side wall of the nozzle body each projecting radially inward from the nozzle body into the central bore engaging a corresponding feature on the poppet.

The poppet has at least one through bore to permit fluid flow therethrough and has the corresponding feature engaging the guide member. This feature preferably is a peripheral zig-zag groove in the outer side wall of the poppet. Each transition below the predetermined threshold causes the poppet to rotate about its axis to permit fluid flow to alternate between the first and second set of ports. The poppet also has at least one other through bore that carries a floating valve pin. This floating pin has a stem in the bore and large plug end that engages and closes one of the plurality of ports through the front portion of the nozzle body when the poppet abuts against either the front portion of the nozzle body or the flow diverter in the central bore.

Alternatively the corresponding feature engaging the guide member may include one or more guide pins protruding from the outer side wall of the poppet into a peripheral zig-zag groove formed in a side wall of the central bore.

The front portion of the nozzle body has at least one bore therethrough leading to the first set of ports and at least one other bore therethrough leading to the second set of ports. The poppet has a front face and at least one of the valve pins protruding from the front face forms a plug which is configured for selectively closing the at least one bore through the front portion of the nozzle body or the flow diverter.

An embodiment of a nozzle assembly in accordance with the present disclosure may be viewed as including a hollow nozzle body connectable to a high pressure fluid supply. This nozzle body has a front portion and a rear portion and a central bore through at least the rear portion, a first plurality of ports extending out of the body from one end of the central bore and a second plurality of ports extending out of the body from the central bore. A switching valve assembly disposed in the central bore is operable to direct fluid flow from an inlet to one or more of the first plurality of ports upon application of fluid flow above a predetermined threshold to the inlet and directs fluid flow from the inlet to one or more of the second plurality of ports upon fluid flow dropping below the predetermined threshold and then exceeding the predetermined threshold. One embodiment of the switching valve assembly includes a cylindrical poppet slidably disposed in the central bore.

The poppet has a plurality of axially extending bores therethrough. A biasing member is positioned between the front portion and the poppet biasing the poppet away from the front portion of the nozzle body. A guide member between the rear portion of the nozzle body and the poppet engages a corresponding feature on the poppet to rotate the poppet as it slides within the rear portion of the cartridge case. The poppet has one or more valve pins each disposed in one of the poppet bores for closing one of the first plurality of ports when aligned with that one of the first plurality of ports when exceeding the predetermined threshold. The poppet in this embodiment has a front face and at least one of the valve pin forms a lug shape protruding from the front face closing one of the ports and at the same time closing the poppet bore carrying the valve pin when the poppet abuts against one of the ports.

Further features, advantages and characteristics of the embodiments of this disclosure will be apparent from reading the following detailed description when taken in conjunction with the drawing figures.

DETAILED DESCRIPTION

Figure 1:
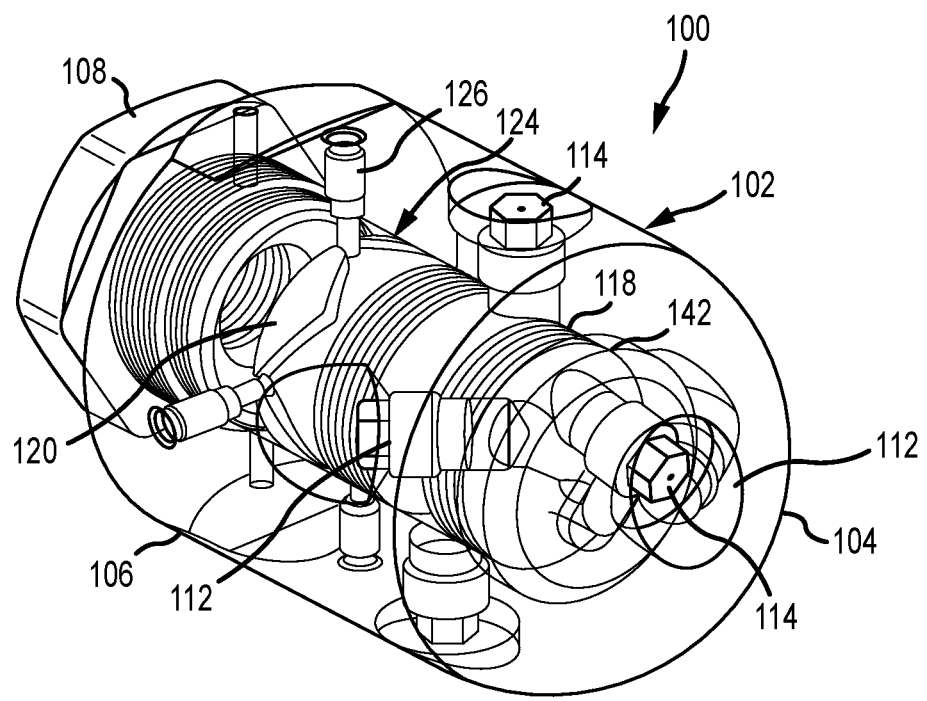
FIG. 1 is perspective view of a switching nozzle head assembly in accordance with a first embodiment of the present disclosure with outer portions transparent to show the inner structure.
Figure 2:
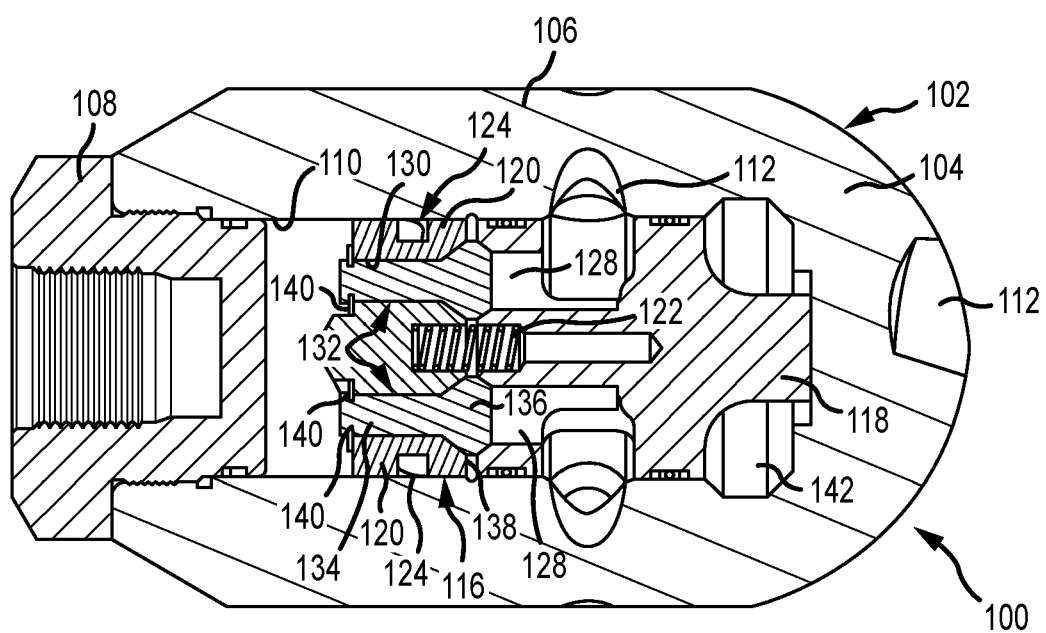
FIG. 2 is an axial cross sectional view of an assembled switching nozzle head assembly shown in FIG. 1.

An exemplary first embodiment of a nozzle assembly 100 incorporating a switching valve assembly is shown in FIGS. 1 and 2. Nozzle assembly 100 has a generally cylindrical solid nozzle body 102 with a front portion 104 which typically has a rounded nose and a generally cylindrical rear portion 106 that can be threadably fastened to an inlet nut 108, which is, in turn, preferably fastened to a distal end of a rotary shaft and, in turn, thence to a high pressure fluid hose (not shown). This nozzle body 102 has a central bore 110 through at least the rear portion 106 of the nozzle body 102 and a plurality of ports 112 drilled through the body 102 each leading from the central bore 110 to a nozzle tip 114 that is threaded into each of the ports 112.

Captured in the central bore 110 between the front portion 104 and the inlet nut 108 in this embodiment is a switching valve assembly 116 and a flow diverter insert 118. This switching valve assembly 116 includes a cylindrical poppet 120 slidably disposed in the central bore 110, a bias member 122 compressed between the poppet 120 and the diverter 118, and a guide 124 between the poppet 120 and the nozzle body 102.

In this first embodiment of the nozzle assembly 100, the guide 124 comprises a groove in the poppet 120 that engages a plurality of guide pins 126 threaded into the body 102 that extend into the central bore 110. The groove 124 is a peripheral zig-zag groove formed in the outer cylindrical surface of the poppet 120. In the embodiment shown, there are four guide pins 126 spaced at 90 degrees apart around the central bore 110. When fluid pressure/flow is applied to the assembled nozzle 100, the poppet 120 slides within the bore 110 forward toward the front portion 104 of the nozzle body 102, being rotated as it moves via the guide 124 until its front end face 138 abuts against the rear face of the flow diverter 118.

In this first embodiment, the flow diverter 118 is a generally cylindrical body positioned in the central bore 110 that has four axial passages 128 therethrough that direct fluid to different sets of ports 112. At least one port 112 is forward through the front portion 104 of the body 102. Other ports 112 are directed outward from the body 102 for cleaning and still others are directed rearward to provide a tractor effect to the nozzle assembly 100 during use, effectively pulling the nozzle assembly 100 into a piping system being cleaned (not shown).

The poppet 120 is a short cylindrical body that has four axially extending bores 130 symmetrically arranged around its central axis. Two oppositely arranged bores 130 carry floating valve pins 132. These valve pins 132 are used to close corresponding aligned passages 128 through the diverter 118. Each valve pin 132 has a stem 134 and an enlarged plug portion 136 that extends from a front face 138 of the poppet 120 giving the valve pin an external shape like an Erlenmeyer flask. The valve pins 132 are each captured within its bore 130 via a snap ring 140 fastened to the stem 134 of the valve pin 132 such that the valve pin 132 floats within its bore through the poppet 120. This floating configuration with an enlarged plug or lug end portion 136 accommodates for tolerance stacking of the nozzle switching valve 116 components and ensures positive sealing between the poppet 120 and the valve pin 132 when fluid pressure/flow is applied to the assembled nozzle 100.

The other two bores 130 (not shown in FIG. 2) through the poppet 120 provide a flow path to the passages 128 in the flow diverter 118. Thus when the poppet 120 is arranged as shown in FIG. 2, the passages 128 directed to the cleaning ports 112 are plugged. The passages 128 that are not shown in the sectional view of FIG. 2 are not plugged permitting fluid flow directly to the tractor and forward ports 112 through a cavity 142 in the central bore 110 in the front portion 104 of the nozzle body 102

FIG. 2 shows the poppet 120 closing two axial passages 128 into the diverter 118. A cross sectional view 90° rotated from that shown would reveal the opposite straight through bores 130 through the poppet 120 aligned with axial passages 128 in the diverter 118 that lead to the cavity 142. The view of FIG. 2 shows the nozzle 100 with the switching valve assembly 116 aligned to provide fluid flow to the front ports and tractor ports 112. When fluid pressure/flow next drops below a threshold defined by the spring rate of spring 122, the poppet 120 would move rearward along the zig zag path of the peripheral groove of the guide 124. When flow next exceeds the threshold, poppet 120 would move forward and rotate to align the straight through passages with the passages 128 in the flow diverter shown in FIG. 2.

Although not shown, the through bores 130 through the poppet 120 that do not carry valve pins 132 may have a larger diameter than those carrying valve pins 132 or they may be similarly shaped to those shown. The valve pin plug portions 136 may extend beyond the end face 138 of the poppet 120 and may be tapered so as to fit within complementary shaped tapered entrances to the mating passages 128 in the diverter 118. The bias member 122 preferably is a coil spring that fits within a blind bore centered within the diverter 118 and has a portion fitting within a central recess in the poppet 120.

Figure 3:
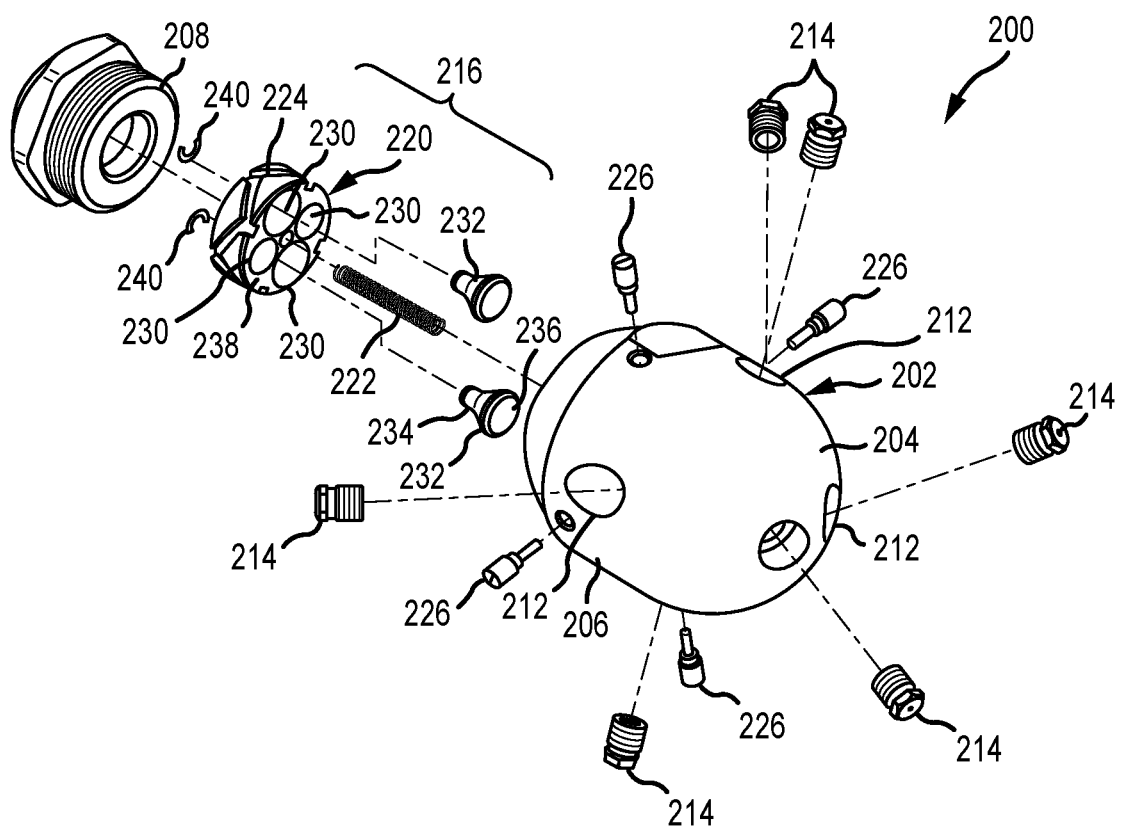
FIG. 3 is an exploded view of a switching nozzle head assembly in accordance with a second embodiment of the present disclosure.
Figure 4:
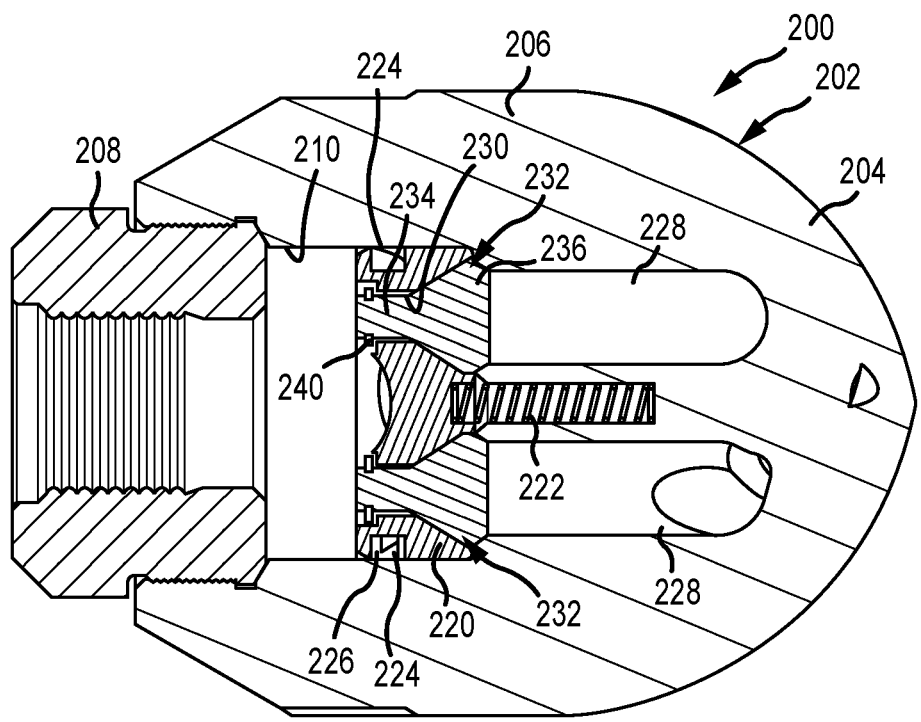
FIG. 4 is an axial cross sectional view through the nozzle head assembly shown in FIG. 3 in a pressurized condition showing flow plugged to tractor ports.
Figure 5:
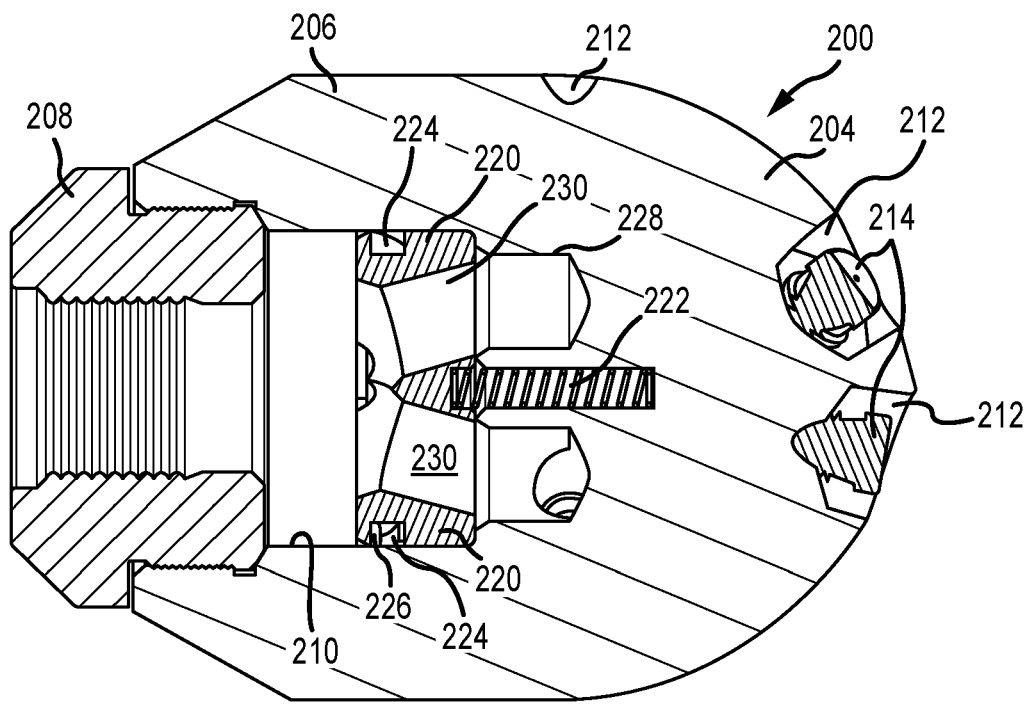
FIG. 5 is an axial cross sectional view through the nozzle head assembly rotated 90 degrees from that shown in FIG. 4, showing the passages through the poppet directing flow to cleaning ports.

A second embodiment of a nozzle assembly 200 incorporating a switching valve assembly 216 as above described is shown in FIGS. 3, 4 and 5. Nozzle assembly 200 is similar to nozzle assembly 100 described above except that the flow diverter 118 has been eliminated. This functionality is incorporated into the front portion of the nozzle body. Nozzle assembly 200 has a generally cylindrical solid nozzle body 202 with a front portion 204 which typically has a rounded nose and a generally cylindrical rear portion 206 that can be threadably fastened to an inlet nut 208, which is, in turn, fastened to a rotary shaft and thence to a high pressure fluid hose (not shown). This nozzle body 202 has a central bore 210 through at least the rear portion 206 of the nozzle body 202 and a plurality of ports 212 drilled through the body 202 each leading from the central bore 210 to a nozzle tip 214 that is threaded into each of the ports 212.

Captured in the central bore 210 between the front portion 204 and the inlet nut 208 in this embodiment is a switching valve assembly 216. This switching valve assembly 216 includes a cylindrical poppet 220 slidably disposed in the central bore 210, a bias member 222 compressed between the poppet 220 and the front portion 204, and a guide 224 between the poppet 220 and the nozzle body 202.

In this second embodiment of the nozzle assembly 200, the guide 224 comprises a groove in the poppet 220 that engages a plurality of guide pins 226 that are threaded into the body 202 and extend into the central bore 210. The groove 224 is a peripheral zig-zag groove formed in the outer cylindrical surface of the poppet 220. In the second embodiment shown, there are four guide pins 226 spaced at 90 degrees apart around the central bore 210. When fluid flow is applied to the assembled nozzle 200, the poppet 220 slides within the bore 210 forward toward the front portion 204 of the nozzle body 202, being rotated as it moves via the guide 224 until its front end face 238 abuts against the rear face of the front portion 204 at the end of the central bore 210.

The poppet 220 is a short cylindrical body that has four axially extending bores 230 symmetrically arranged around its central axis. Two oppositely arranged bores 230 carry floating valve pins 232. These valve pins 232 are used to close corresponding aligned passages 228 through the front portion 204 of the nozzle body 202. Each valve pin 232 has a stem 234 and an enlarged plug portion 236 extend from a front face 238 of the poppet 220 giving the valve pin an external shape like an Erlenmeyer flask. The valve pins 232 are each captured within its bore 230 via a snap ring 240 fastened to the stem 234 of the valve pin 232 such that the valve pin 232 floats within its bore through the poppet 220. This floating configuration with an enlarged plug or lug end portion 236 accommodates for tolerance stacking of the nozzle switching valve 216 components. Further, an O-ring seal (not shown) may be installed between the chamfer of the enlarged plug portion 236 and the front portion 204 of the nozzle body 202 to provide a positive seal.

The other two bores 230 (shown in FIG. 5) through the poppet 220 provide a flow path to the passages 228 in the front portion 204 of the nozzle body 202. Thus when the poppet 220 is arranged as shown in FIG. 4, the passages 228 directed to the cleaning ports 212 are plugged. The passages 228 that are shown in the sectional view of FIG. 5 are not plugged permitting fluid flow directly to the tractor and forward ports 212 through the front portion 204 of the nozzle body 202.

FIG. 4 shows the poppet 220 closing two axial passages 228 into the front portion 204 of the nozzle body 202. A cross sectional view 90° rotated from that shown is shown in FIG. 5 showing the opposite straight through bores 230 through the poppet 220 aligned with axial passages 228 in the front portion 204. The view of FIGS. 4 and 5 shows the nozzle 200 with the switching valve assembly 216 aligned to provide fluid flow to the lateral cleaning ports 212. When fluid flow next drops below a threshold flow defined by the spring rate of spring 222, the poppet 220 would move rearward along the zig zag path of the peripheral groove of the guide 224. When flow next exceeds the threshold, poppet 220 would move forward and rotate to align the straight through passages with the other pair of passages 228 to the tractor and forward ports 212.

Figure 6:
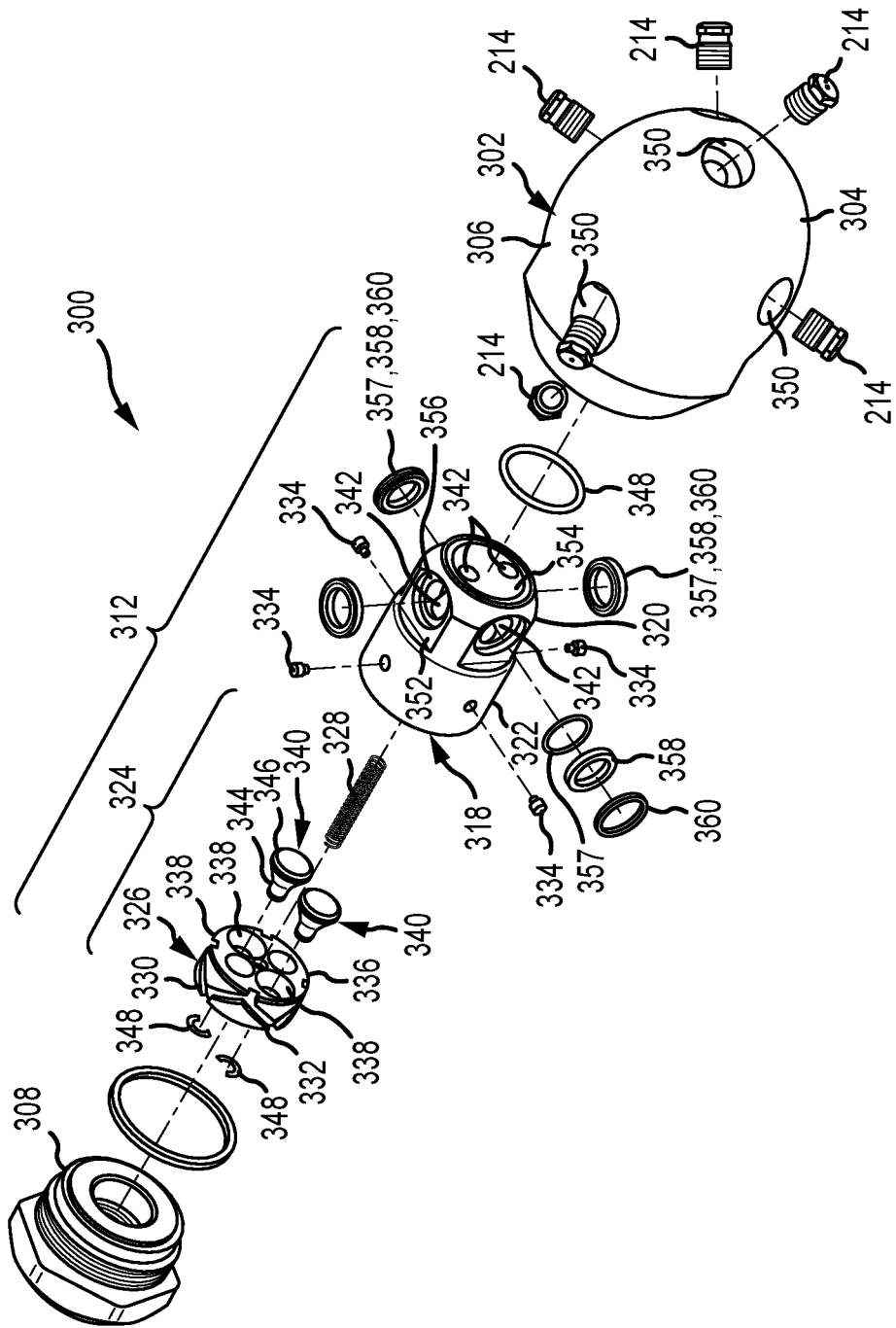
FIG. 6 is an exploded view of a switching nozzle head assembly in accordance with a third embodiment of the present disclosure.
Figure 7:
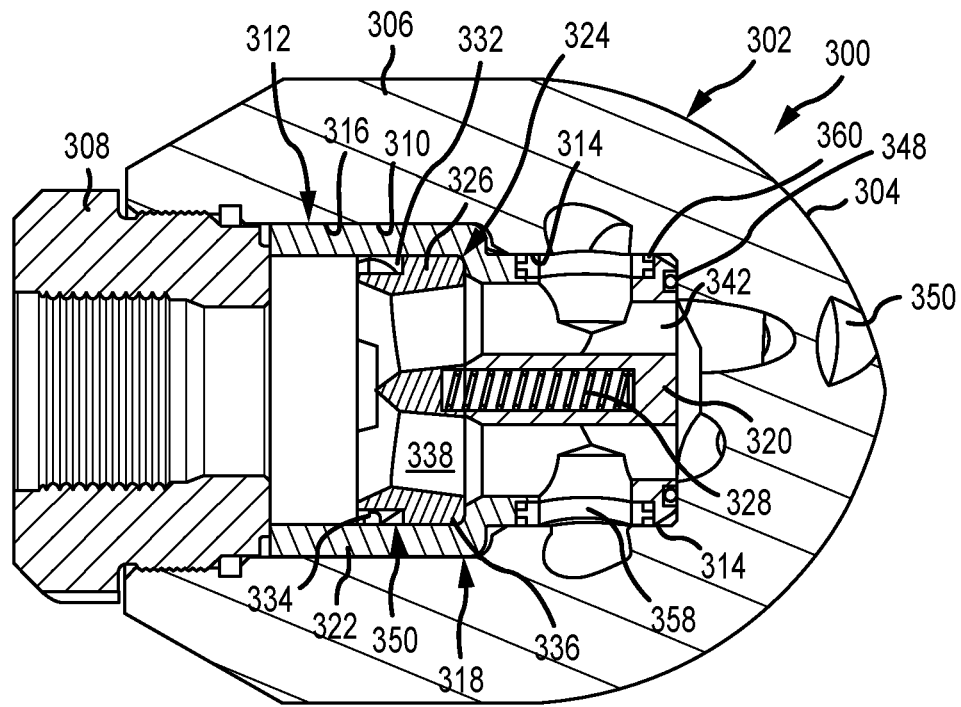
FIG. 7 is an axial cross sectional view through the nozzle assembly as in FIG. 6, showing the poppet directing flow to the tractor ports.
Figure 8:
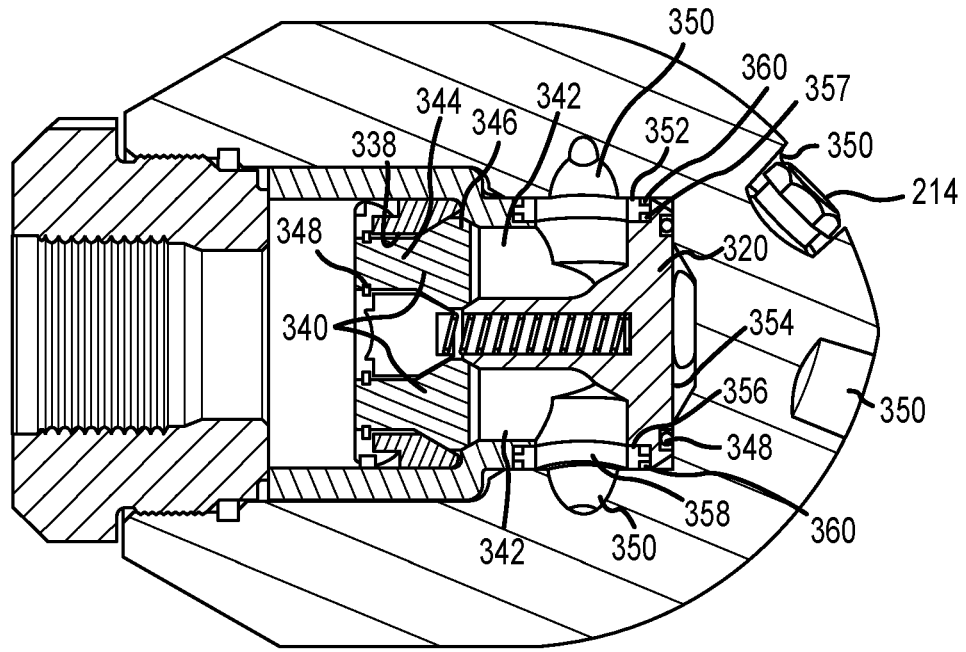
FIG. 8 is an axial cross sectional view through the nozzle assembly as in FIG. 7 but rotated 90 degrees, showing the poppet plugging the passages to the cleaning ports.

Another switching valve nozzle assembly in accordance with the present disclosure is shown in FIGS. 6, 7 and 8. This nozzle assembly 300 includes a hollow nozzle body 302 that has a round nose front portion 304 and a generally cylindrical rear portion 306. The nozzle body 302 has a central blind bore 310 that receives a removable valve cartridge 312. The blind bore 310 has a block shaped front portion 314 and a circular cylindrical rear portion 316. This removable cartridge 312 is shaped complementary to the central blind bore 310 and is captured within the blind bore 310 by a nozzle inlet nut 308 fastened to the nozzle body 302 and which, in turn, connects to a rotatable shaft and thence to a high pressure fluid hose (not shown).

The removable cartridge 312 includes a case 318 externally shaped complementary to the blind bore 310 with a front block portion 320 that acts as a flow diverter having a plurality of passages therethrough each configured to align with a port drilled through the nozzle body 302 into the front portion 314 of the blind bore 310. The case 318 has a hollow circular cylindrical rear portion 322 that carries within it a switching valve assembly 324.

This switching valve assembly 324 is similar to the switching valve assemblies 116 and 216 described above. This switching valve assembly 324 includes a cylindrical poppet 326 slidably disposed in the cylindrical rear portion 322 of the case 318, a bias member 328 compressed between the poppet 326 and the front portion 320 of the case 318, and a guide 330 operating between the poppet 326 and the rear portion 322 of the case 318.

The guide 330 comprises a groove 332 in the poppet 326 that engages a plurality of guide pins 334 that are threaded into the case 318 and extend into the rear portion 322 of the case 318. The groove 332 is a peripheral zig-zag groove formed in the outer cylindrical surface of the poppet 326. In this third embodiment shown, there are four guide pins 334 spaced at 90 degrees apart around the case 318. When fluid pressure is applied to the assembled nozzle 300, the poppet 326 slides within the case 318 forward toward the front portion 320 of the case 318, being rotated as it moves via the guide 330 until its front end face 336 abuts against the rear face of the front portion 320 of the case 318.

The poppet 326 is a short cylindrical body that has four axially extending bores 338, shown in FIG. 6, symmetrically arranged 90° apart around its central axis. Two oppositely arranged bores 338 carry floating valve pins 340. These valve pins 340 are used to close corresponding aligned passages 342 through the front portion 320 of the cartridge case 318. Each valve pin 340 has a stem 344 and an enlarged plug portion 346 that extends from a front face 336 of the poppet 326 giving the valve pin 340 an external shape like an Erlenmeyer flask. The valve pins 340 are each captured within its bore 338 via a snap ring 348 fastened to the stem 344 of the valve pin 340 such that the valve pin 340 floats within its bore 338 through the poppet 326. This floating configuration with an enlarged plug or lug end portion 346 accommodates for tolerance stacking of the nozzle switching valve 326 components. Further, an O-ring seal (not shown) may be installed between the chamfer of the enlarged plug portion 346 and each passage 342 in the front portion 320 of the cartridge case 318 to provide a positive seal.

The other two bores 338 (shown in FIG. 7) through the poppet 326 provide a flow path to the passages 342 in the front portion 320 of the cartridge case 318. Thus when the poppet 326 is arranged as shown in FIG. 8, the passages 338 directed to the cleaning ports 350 are plugged. The passages 338 that are not shown in the sectional view of FIG. 7 are not plugged permitting fluid flow directly to the tractor and forward ports 350 through the front portion 320 of the case 318 and thence through the front portion 304 of the nozzle body 302.

FIG. 8 shows the poppet 326 closing two axial passages 342 into the front portion 320 of the cartridge case 318. FIG. 8 is a cross sectional view 90° rotated from that shown is shown in FIG. 7 showing the opposite straight through bores 338 through the poppet 326 aligned with axial passages 342 in the front portion 320. The views in both FIGS. 7 and 8 show the nozzle 300 with the switching valve assembly 324 aligned to provide fluid flow to the tractor and forward ports 350. When fluid flow next drops below a threshold defined by the spring rate of spring bias member 328, the poppet 326 would move rearward along the zig zag path of the peripheral groove of the guide 330. When flow next exceeds the threshold pressure, poppet 326 would move forward and rotates to align the straight through passages with the other pair of passages 342 to the lateral cleaning ports 350. Each port 350 receives a threaded nozzle tip 214 as in the embodiments previously described.

The front block portion 320 of the case 318 in this embodiment 300 has four axially straight side faces 352 and a flat end face 354. Each of these faces 352 has a circular groove 356 carrying an O-ring 357 and a plastic face seal 358 around an opening to its corresponding port 350 in the front portion 304 of the nozzle head body 302. The circular groove 356 may optionally also carry an annular metal anti-extrusion ring 360 to prevent extrusion of the plastic face seal 358 when the nozzle 300 is under pressure. The plastic face seal 358 bridges the gap between the case 318 and the nozzle body 302. The anti-extrusion ring 360 also keeps the plastic face seal 358 in proper position during insertion and removal of the case 318 in the central bore 310 of the nozzle body 302.

This cartridge case 318 may be made of a metal or thermoplastic material such as a high molecular weight polyethylene and may be injection molded. One preferable material is ultra-high molecular weight polyethylene. Similarly, the poppet 326 itself may be made of a plastic rather than metal. Other than the coil spring 328 and the valve pins, the valve assembly 324 may be made of plastic as it does not have to withstand the high stresses encountered during nozzle operation. The nozzle head body 302 and inlet nut 308 provide the strength required for high pressure operation.

Figure 9:
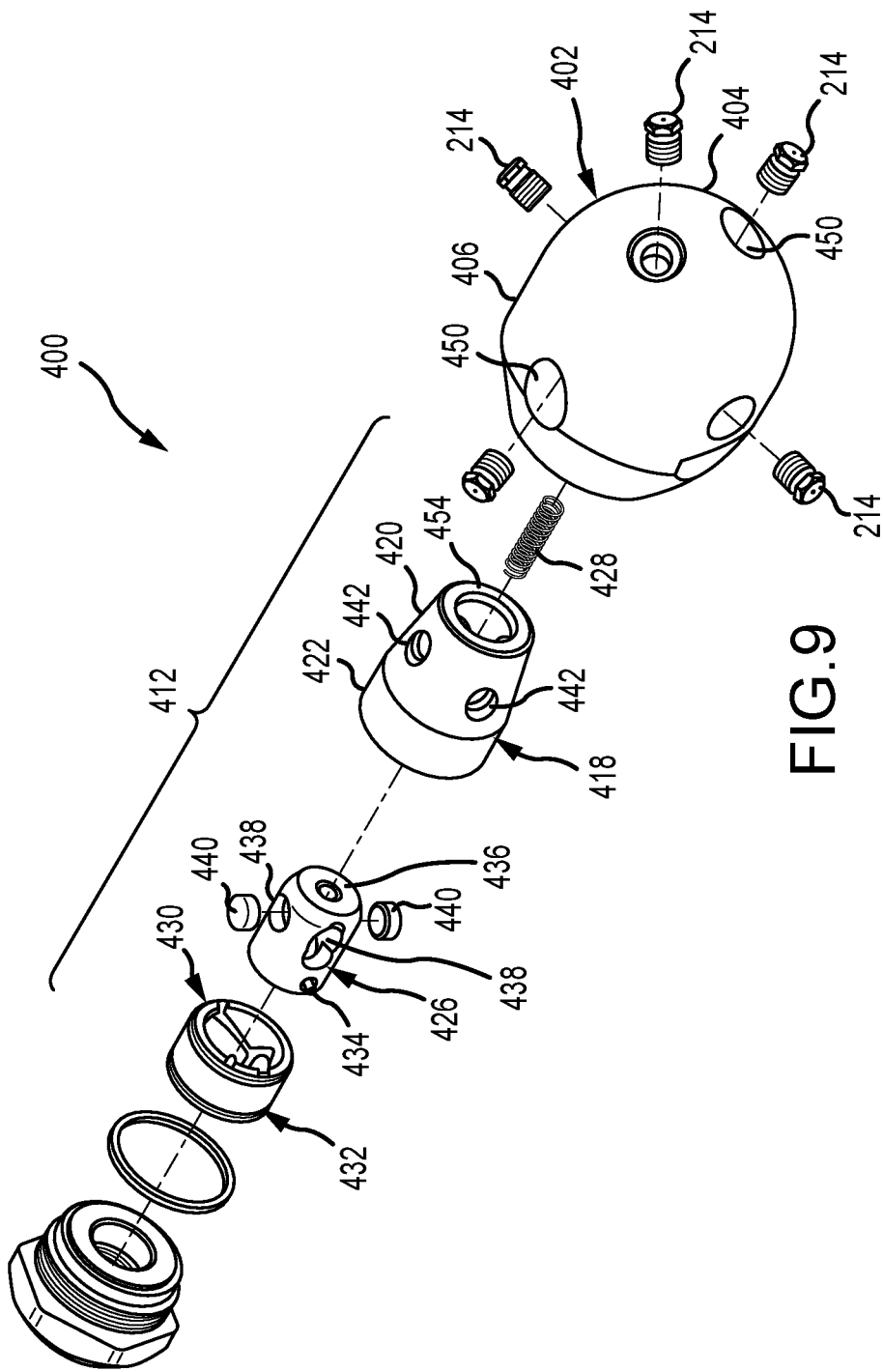
FIG. 9 is an exploded view of a switching nozzle assembly in accordance with a fourth embodiment of the present disclosure.
Figure 10:
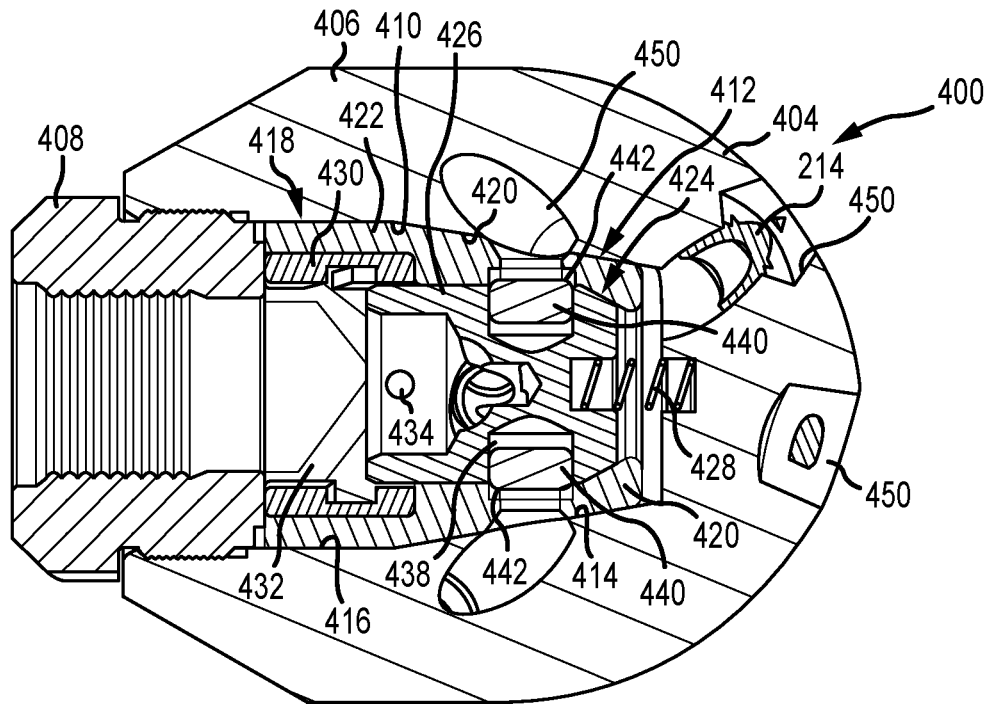
FIG. 10 is a longitudinal cross sectional view of the nozzle assembly shown in FIG. 9 in a pressurized condition showing the poppet plugging the traction ports.
Figure 11:
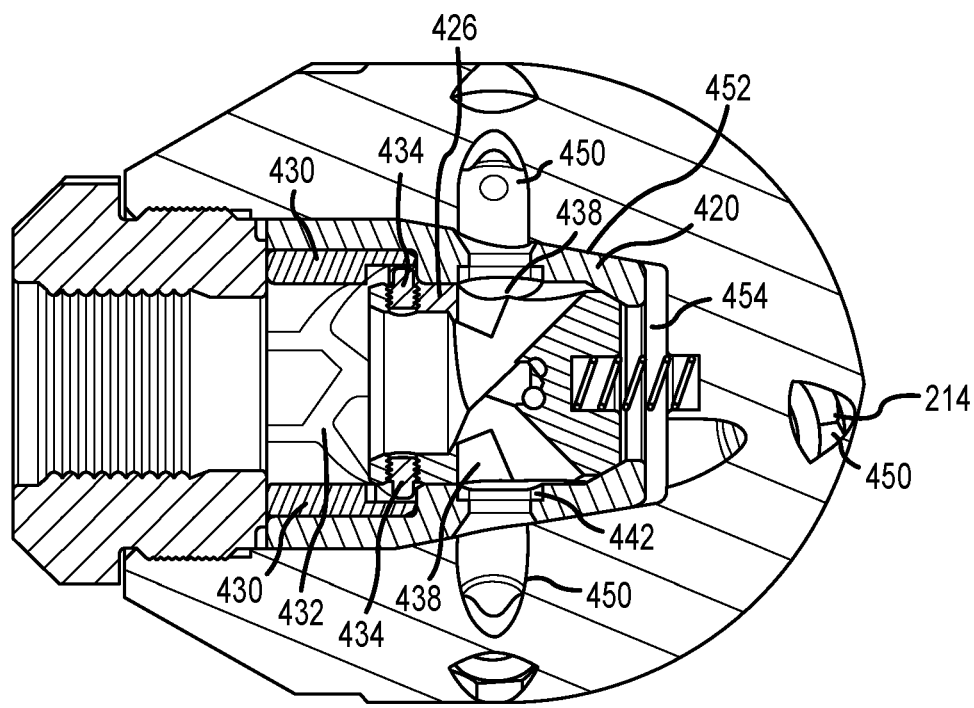
FIG. 11 is a longitudinal cross sectional view, rotated 90 degrees, of the nozzle assembly shown in FIG. 10 showing the passages through the poppet permitting flow to the cleaning ports.

Another alternative embodiment of a nozzle head incorporating a switching valve in accordance with the present disclosure is shown in FIGS. 9 through 11. This nozzle assembly 400 includes a hollow nozzle body 402 that has a round nose front portion 404 and a generally cylindrical rear portion 406. The nozzle body 402 has a central blind bore 410 that receives a removable valve cartridge 412. The blind bore 410 has a truncated conical tapered front portion 414 and a circular cylindrical rear portion 416. This removable cartridge 412 is captured within the blind bore 410 by a nozzle inlet nut 408 fastened to the nozzle body 402 and which, in turn, connects to a high pressure hose or to a rotary shaft (not shown).

The removable cartridge 412 includes a case 418 externally shaped complementary to the blind bore 410 with a front tapered portion 420 that acts as a flow diverter having a plurality of passages therethrough each configured to align with a port 450 drilled through the nozzle body 402 into the front portion 414 of the blind bore 410. The case 418 has a hollow circular cylindrical rear portion 422 that carries within it a portion of a switching valve assembly 424.

This switching valve assembly 424 functions similar to the switching valve assemblies 116, 216 and 324 described above. This switching valve assembly 424 includes a cylindrical poppet 426 slidably disposed partially in the cylindrical rear portion 422 of the case 418 and partially in the front portion 420 of the case 418, a bias member 428 compressed between the poppet 426 and the front portion 420 of the case 418, to the front portion 404 of the nozzle body 402 and a guide 430 operating between the poppet 426 and the rear portion 422 of the case 418.

The guide in this embodiment 400 comprises a stationary tubular sleeve 430 set into the rear portion 422 of the case 418 that has an internal zig-zag groove 432. The poppet 426 includes a plurality of radially protruding pins 434 each engaging the groove 432 in the sleeve 430 set into the rear portion 422 of the case 418. The pins 434 are threaded through a rear portion of the poppet 426 and extend radially outward so as to ride in the groove 432 as the poppet 426 moves back and forth in the case 418. In this fourth embodiment shown, there are two guide pins 434 spaced at 180 degrees apart around the case 418. When fluid flow is applied to the assembled nozzle 400, the poppet 426 slides within the case 418 forward toward the front portion 420 of the case 418, being rotated as it moves via the guide 430 until its front end face 436 abuts against the front portion 420 of the case 418.

The poppet 426 is a short cylindrical body that has a common rear opening that diverges to four bores 438 symmetrically arranged 90° apart around its central axis. Two are biased forward, and two are biased rearward. Two oppositely arranged bores 438 are radially directed and carry floating valve plugs 440. In this embodiment, the floating valve plugs 440 free float in their radial bores 438. These valve plugs 440 close corresponding aligned passages 442 through the side of the front portion 420 of the cartridge case 418 as shown in FIG. 10.

The other two bores 438 (shown in FIG. 11) through the poppet 426 provide a flow path to the passages 442 through the side of the front portion 420 of the cartridge case 418. Thus when the poppet 426 is arranged as shown in FIG. 10, the passages 438 directed to the tractor and front or forward ports 450 are plugged. The passages 438 that are shown in the sectional view of FIG. 11 are not plugged permitting fluid flow directly to the cleaning ports 450 through the front portion 420 of the case 418.

FIGS. 10 and 11 both show the same configuration, with the cleaning ports open and the forward and tractor ports plugged. FIG. 10 shows the poppet 426 closing two axial passages 442 into the front portion 420 of the cartridge case 418. A cross sectional view 90° rotated from that shown is shown in FIG. 11 showing the opposite through bores 438 through the poppet 426 aligned with axial passages 442 in the front portion 420. The view of FIGS. 10 and 11 shows the nozzle 400 with the switching valve assembly 424 aligned to provide fluid flow to the cleaning ports 450. When fluid pressure next drops below a threshold flow defined by the spring rate of spring bias member 428, the poppet 426 would move rearward along the zig zag path of the peripheral groove of the guide 430. When flow next exceeds the threshold pressure, poppet 426 would move forward and rotates to align the poppet passages with the other pair of passages 442 to the tractor and forward ports 450.

The front tapered portion 420 of the case 418 in this embodiment 400 has a single circular conical side face 452 and an open end face 454. Because of the tapered conical side face 452, there is no need for an O ring seal around each of the four port openings 450 as in embodiment 300, as the taper itself provides the seal. In this embodiment 400, the end of the poppet 426 provides a seat that seals the end face 454 of the case 418 when the poppet is aligned with the cleaning ports as shown in FIGS. 9-11. When the poppet is aligned to provide flow to the tractor ports, the poppet 426 is displaced from the end face 454 of the case 418 to permit flow through passages 438 to the forward ports 450. This cartridge case 418 may be made of a metal or thermoplastic material and may be injection molded. One preferable material is ultra-high density polyethylene. Similarly, the poppet 426 itself may be made of a plastic rather than metal. Other than the coil spring 422, the components of the valve assembly 424 may be made of plastic. However, the valve pins do see full pressure and therefore may be made of metal or a different high strength plastic. The nozzle head body 402 and inlet nut 408 primarily provide the strength required for containment of the cartridge 412 during high pressure operation. Each of the ports 450 preferably carries a removable threaded nozzle tip 214 just as in the previously described embodiments.

Many changes may be made to the embodiments described above. For example, the guide pins 434 may be threaded through the wall of the poppet 426 or may be press fit. The poppet 426 may have a peripheral groove as in the first three embodiments described above and the cartridge case 418 provided with the guide pins.

All such changes, alternatives and equivalents in accordance with the features and benefits described herein, are within the scope of the present disclosure. Such changes and alternatives may be introduced without departing from the spirit and broad scope of my invention as defined by the claims below and their equivalents.

What is claimed is:

1. A nozzle assembly comprising:
    an inlet nut fastenable to a distal end of one of a rotatable nozzle shaft or a hose;
    a hollow nozzle body having a front portion, a rear inlet portion configured to engage the inlet nut, a central bore through at least the rear inlet portion of the nozzle body, and a plurality of ports extending through the nozzle body from the central bore; and
    a switching valve assembly disposed in the central bore operable to direct fluid flow from the rear inlet portion to at least one set of the plurality of ports upon application of fluid flow above a predetermined threshold to the rear inlet portion of the nozzle body and direct fluid flow from the rear inlet portion of the nozzle body to at least a different set of the plurality of ports upon fluid flow having subsequently dropped below the predetermined threshold and then exceeding the predetermined threshold, the switching valve assembly comprising:
        a cylindrical poppet slidably disposed in the central bore through the rear inlet portion of the nozzle body, the poppet having at least one axially extending through bore to permit fluid flow therethrough, and the poppet having another axially extending through bore containing a floating valve pin having a stem captured within the another though bore between a snap ring and a lug end portion protruding from the another through bore for closing at least one of the ports;
        a guide cooperating with the poppet to rotate the poppet in one direction to alternate fluid flow between the ports; and
        a biasing member between the front portion of the nozzle body and the poppet urging the poppet away from the front portion of the nozzle body.

2. The nozzle assembly according to claim 1 wherein the guide includes one or more guide members engaging the poppet to alternatingly rotatably align the poppet with the at least one set of the plurality of ports and the different set of the plurality of ports each time the poppet abuts the front portion of the nozzle body.

3. The nozzle assembly according to claim 1 wherein the guide member comprises pins projecting inward from the rear inlet portion of the nozzle body into the central bore engaging the poppet.

4. The nozzle assembly according to claim 2 wherein the poppet has a peripheral groove engaging the one or more guide members.

5. The nozzle assembly according to claim 4 wherein each transition below the predetermined threshold causes the poppet to rotate to a different angular position to permit fluid flow to alternate between the first and second set of ports.

6. The nozzle assembly according to claim 1 wherein the switching valve assembly includes a removable tubular case within the bore carrying the poppet and the guide therein, wherein the case has a front portion and a rear portion, the rear portion carrying the poppet and guide therein, and the biasing member is within the front portion of the tubular case.

7. The nozzle assembly according to claim 6 wherein the front portion of the case has at least one bore therethrough leading to the first set of ports and at least one other bore therethrough leading to the second set of ports.

8. The nozzle assembly according to claim 7 wherein the poppet has a front face and at least one valve pin disposed in a through bore and protruding from the front face for selectively closing the at least one bore through the front portion of the tubular case.

9. The nozzle assembly according to claim 7 wherein the poppet is a circular cylindrical body having a plurality of through bores and at least one of the through bores carries a valve pin therein having a lug shaped end portion protruding from a front face of the poppet for selectively closing the at least one bore through the front portion of the tubular case.

10. The nozzle assembly according to claim 1 wherein the guide rotates the poppet a predetermined amount each time the poppet moves toward or away from the front portion of the nozzle body.

11. The nozzle assembly according to claim 6 wherein the case has two or more axial bores through the front portion equally spaced about a central axis through the case and two or more angled bores through the front portion extending through a side of the case.

12. The nozzle assembly according to claim 11 wherein the front portion of the case has straight rectangular side wall portions.

13. The nozzle assembly according to claim 11 wherein the front portion of the case is tapered.

14. The nozzle assembly according to claim 12 wherein the rear portion of the case has a right circular cylindrical shape.

15. A nozzle assembly comprising:
a hollow nozzle body connectable to one of a rotatable shaft or a distal end of a hose, the nozzle body having a front portion and a rear portion and a central bore through at least the rear portion, a first plurality of ports extending out of the nozzle body from one end of the central bore and a second plurality of ports extending out of the nozzle body from the central bore; and
a switching valve assembly disposed in the central bore operable to direct fluid flow from an inlet to one or more ports of the first plurality of ports upon application of fluid flow above a predetermined threshold to the inlet and direct fluid flow from the inlet to one or more ports of the second plurality of ports upon fluid flow dropping below the predetermined threshold and then exceeding the predetermined threshold, wherein the switching valve assembly comprises:
a cylindrical poppet slidably disposed in the central bore, the poppet having a plurality of axially extending bores therethrough;
a biasing member between the front portion of the nozzle body and the poppet biasing the poppet away from the front portion of the nozzle body; and
a guide member between the rear portion of the nozzle body and the poppet engaging a corresponding feature on the poppet to rotate the poppet as it slides within the rear portion of the nozzle body, wherein the poppet has a floating valve pin having a stem captured in one of the poppet bores between a snap ring and a lug end portion protruding from the one of the poppet bores for closing one port of the first plurality of ports when aligned with that one port of the first plurality of ports when fluid flow is exceeding the predetermined threshold.

16. The nozzle assembly according to claim 15 wherein the poppet has a front face and at the front face the lug end portion closes the one poppet bore carrying the floating valve pin when the poppet abuts against that one port of the first plurality of the ports.

* * * * *